United States Patent
Gong et al.

(10) Patent No.: US 8,320,112 B2
(45) Date of Patent: Nov. 27, 2012

(54) PORTABLE ELECTRONIC DEVICE

(75) Inventors: Yan-Hong Gong, Shenzhen (CN); Jing-Jing Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 200 days.

(21) Appl. No.: 12/868,167

(22) Filed: Aug. 25, 2010

(65) Prior Publication Data

US 2011/0292583 A1 Dec. 1, 2011

(30) Foreign Application Priority Data

May 26, 2010 (CN) .......................... 2010 1 0184597

(51) Int. Cl.
*G06F 1/16* (2006.01)

(52) U.S. Cl. ..................... 361/679.26; 710/74; 345/175; 455/575.1

(58) Field of Classification Search ................ 345/173, 345/174, 175, 684, 650, 419; 710/11, 58, 710/62, 74; 361/679.26, 679.27, 679.28, 361/679.33, 679.32, 679.4, 679.39, 679.21, 361/679.22; 455/575.4, 575.3, 575.2, 575.1
See application file for complete search history.

(56) References Cited

U.S. PATENT DOCUMENTS

| | | | |
|---|---|---|---|
| 2010/0202105 A1* | 8/2010 | Chang | 361/679.27 |
| 2010/0328549 A1* | 12/2010 | Wu et al. | 348/744 |
| 2011/0187649 A1* | 8/2011 | Chu et al. | 345/168 |

* cited by examiner

Primary Examiner — Hung Duong
(74) Attorney, Agent, or Firm — Altis Law Group, Inc.

(57) ABSTRACT

A portable electronic device includes a host, a display unit pivotably connected to the host, and a projecting unit received in the display unit. The projecting unit is configured for receiving video signals from the host and projecting corresponding image on the display unit.

18 Claims, 5 Drawing Sheets

PORTABLE ELECTRONIC DEVICE

BACKGROUND

1. Technical Field

The present disclosure relates to electronic devices, and particularly to a portable electronic device.

2. Description of Related Art

Most displays are pivotably connected to portable electronic devices, such as notebook computers and mobile phones. However, the displays are often fixed in size. Thus group viewing the display with another person, may be inconvenient on smaller fixed sized displays.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of a portable electronic device. Moreover, in the drawings, like reference numerals designate corresponding parts throughout the views.

DETAILED DESCRIPTION

Figure 1:
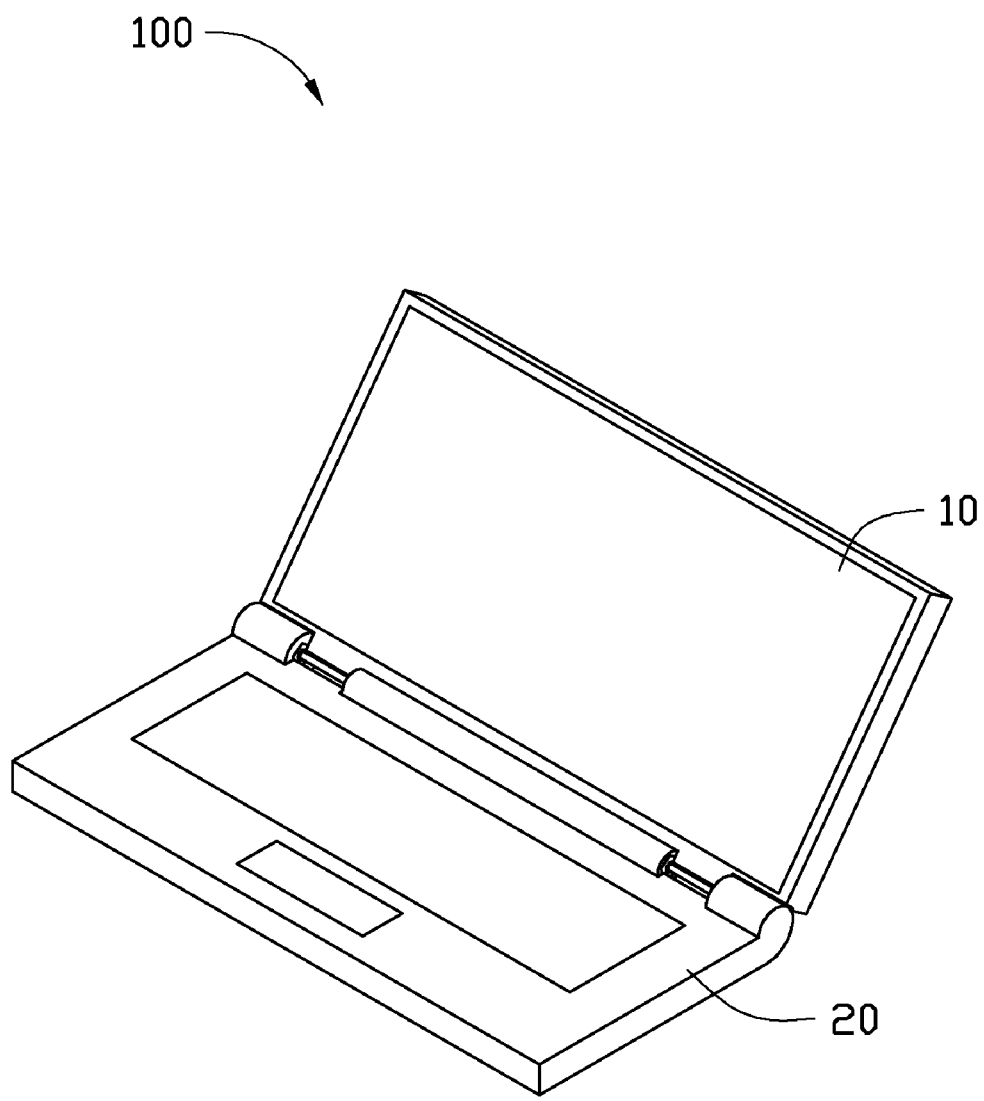
FIG. 1 is an isometric, schematic view of a portable electronic device according to an exemplary embodiment in one state.

Embodiments of the present disclosure will now be described in detail with reference to the drawings.

Referring to FIGS. 1 to 4, a portable electronic device 100 according to an exemplary embodiment is illustrated. In this embodiment, the portable electronic device 100 is a notebook computer. The portable electronic device 100 includes a display unit 10, a host 20, a projecting unit 30, and a lifting unit 35.

Figure 2:
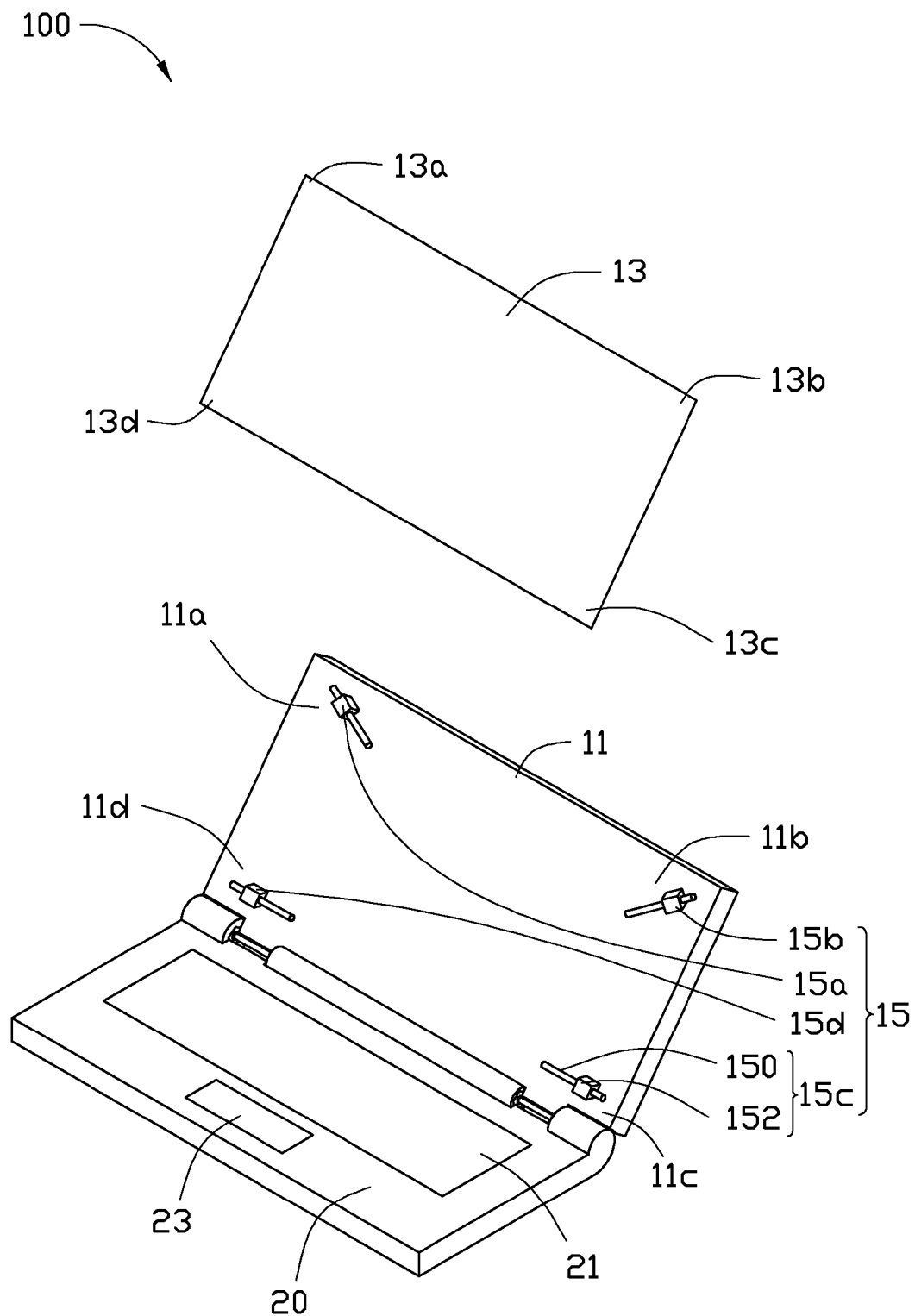
FIG. 2 is an exploded view of the portable electronic device.

Referring to FIG. 2, the display unit 10 is pivotably connected to the host 20. The display unit 10 includes a cover 11, an extensible screen 13, and a stretching unit 15.

The cover 11 is substantially rectangular. The cover 11 is used for covering the host 20 when the portable electronic device 100 is in a closed state. The cover 11 includes four edges 11a, 11b, 11c, and 11d which are serially interconnected. The cover 11 at the side of the edge 11c is pivotably connected to the host 20.

The stretching unit 15 is used for stretching the screen 13. The stretching unit 15 includes four drivers 15a, 15b, 15c, and 15d. The four drivers 15a, 15b, 15c, and 15d are installed on four corners of the cover 11. The two drivers 15c and 15d are disposed on opposite ends of the edge 11c. The two drivers 15a and 15b are disposed on two diagonal lines of the cover 11. Each of the four drivers 15a, 15b, 15c, and 15d includes a rotor 150 and a stator 152 used for driving the rotor 150 linearly. Two rotors 150 of the drivers 15c and 15d are substantially cylindrical and are parallel to the edge 11c. Two stators 152 of the drivers 15c and 15d are used for driving the corresponding rotors 150 linearly along the edge 11c. Two rotors 150 of the drivers 15a and 15b are substantially cylindrical and are parallel to the two diagonal lines of the cover 11. Two stators 152 of the drivers 15a and 15b are used for driving the corresponding rotors 150 linearly along the diagonal lines of the cover 11. In this embodiment, the four drivers 15a, 15b, 15c and 15d are four linear motors. The stretching unit 15 is not limited to the four linear motors.

Figure 3:
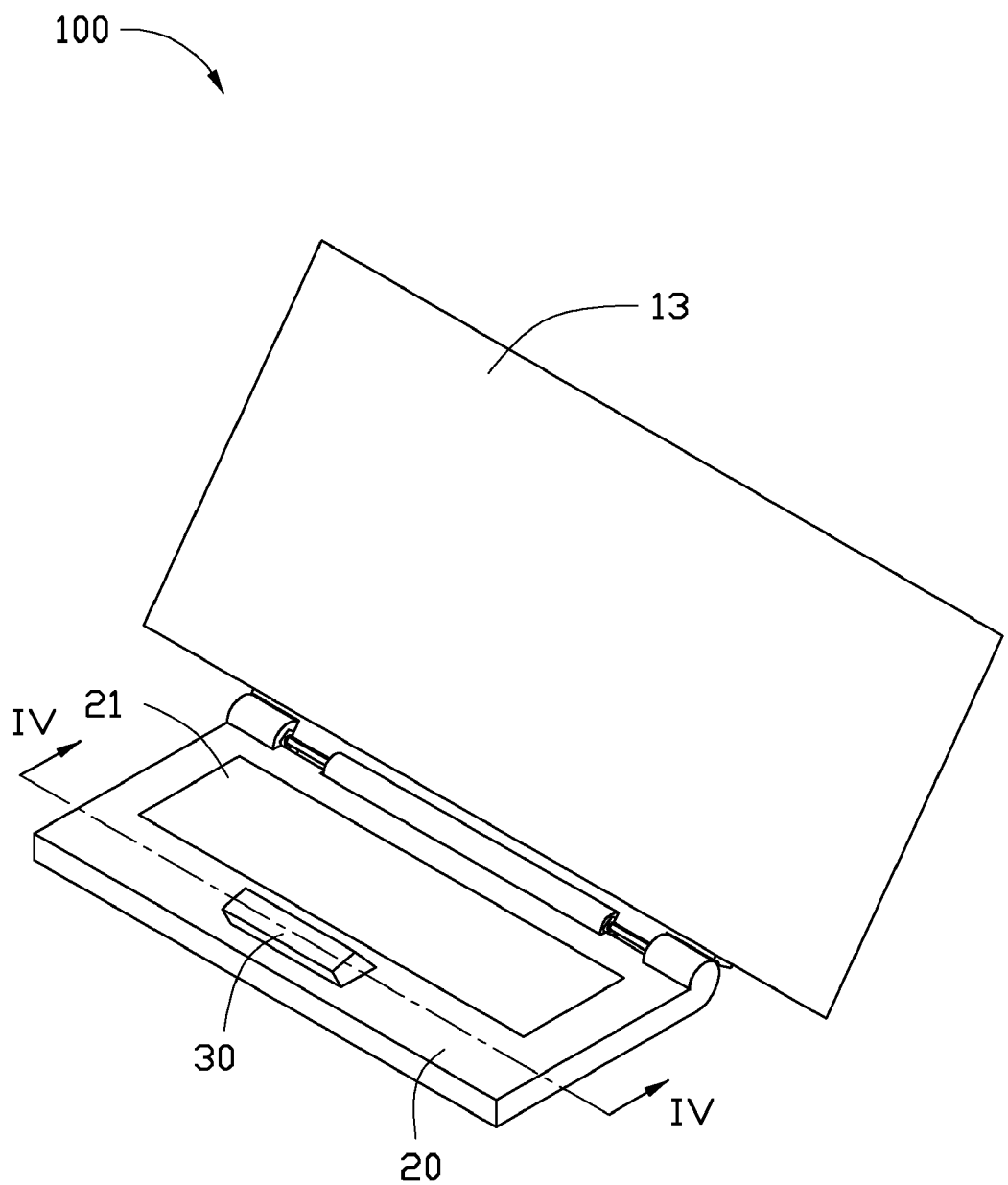
FIG. 3 is similar to FIG. 1, but showing the portable electronic device in another state.

The screen 13 is substantially rectangular. The screen 13 is movably disposed on the cover 11 and is directed towards the keyboard 21 when the portable electronic device 100 in the closed state. The screen 13 is made of elastic materials, thus, the screen 13 has good elasticity to be extensible. In this embodiment, the screen 13 is made of silicone materials. The screen 13 includes four corners 13a, 13b, 13c, and 13d. The four corners 13a, 13b, 13c, and 13d are respectively disposed on the four rotors 150 of the four drivers 15a, 15b, 15c, and 15d. The four drivers 15a, 15b, 15c, and 15d can drive the screen 13 to be extensible (as shown in FIG. 3). Thus, size of the screen 13 is adjustable under the help of the stretching unit 15.

The portable electronic device 100 can display a menu item for activating the stretching unit 15. The portable electronic device 100 also can set a key for activating the stretching unit 15. For example, when the portable electronic device 100 is in an open state, and the host 20 of the portable electronic device 100 is activated, the users can activate the stretching unit 15 by selecting the menu item or pressing the key. Thus, the size of the screen 13 is easily adjusted.

Figure 4:
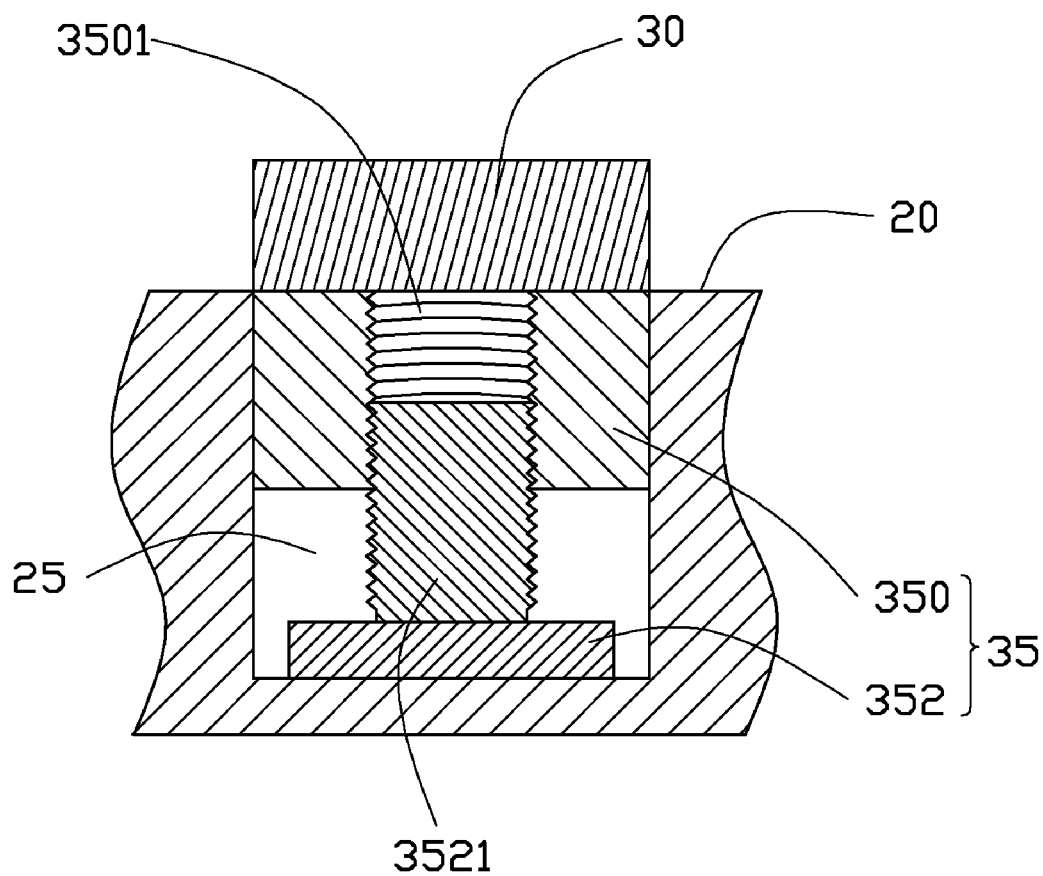
FIG. 4 is a partial, cross-sectional view of the portable electronic device of FIG. 3 along the line IV-IV.

Referring to FIGS. 2 and 4, the host 20 includes a keyboard 21 and a touch pad 23. The keyboard 21 and the touch pad 23 are disposed on the external surface of the host 20, and are directed up when the portable electronic device 100 is in the closed state. The host 20 defines a compartment 25. The compartment 25 is defined under the touch pad 23. The touch pad 23 acts as an automatic door for automatically covering the compartment 25.

The projecting unit 30 is received in the compartment 25 and is electrically connected to the video interface (not shown) of the host 20. The projecting unit 30 is used for receiving video signals transmitted from the host 20 and projects corresponding images on the screen 13 using a lens system (not shown). In this embodiment, the projecting unit 30 is a mini-projector. The projecting unit 30 is placed on the lifting unit 35 such that the position and the angle of projection of the projecting unit 30 are adjustable.

The lifting unit 35 and the projecting unit 30 are received in the compartment 25. The lifting unit 35 is used for loading the projecting unit 30, and further for driving the projecting unit 30 to raise and lower the projecting unit 30 in relationship to the host 20.

The lifting unit 35 includes a platform 350 and a driving subunit 352. The platform 350 is used for loading the projecting unit 30. The driving subunit 352 is used for driving the platform 350 up or down. Thus, the projecting unit 30 can be raise or lower in relationship to the host 20. When the projecting unit 30 is driven to protrude up from the host 20, the projecting unit 30 projects images corresponding to video signals from the host 20 on the screen 13. When the projecting unit 30 is driven into a hidden position of the host 20, the projecting unit 30 is turned off.

In this embodiment, the driving subunit 352 is a motor including a shaft 3521. The driver subunit 352 is received in the compartment 25. A through hole 3501 is defined in the platform 350. The shaft 3521 of the driver subunit 352 is received in the through hole 3501 and is engaged with the platform 350. When the driver subunit 352 drives the shaft 3521 to rotate, the platform 350 can lift up or down along the shaft 3521 correspondingly. Thus, the height of the projecting unit 30 can be adjusted by the lifting unit 35.

The portable electronic device 100 can set a menu item for activating the driver subunit 352 of the lifting unit 35. The portable electronic device 100 may establish a key for activating the driver subunit 352 of the lifting unit 35. For example, when the portable electronic device 100 is in an open state, and the host 20 of the portable electronic device 100 is activated, the users can activate the driver subunit 352 of the lifting unit 35 by selecting the menu item or pressing the key.

As discussed above, the portable electronic device 100 can adjust the size of the screen 13 by the stretching unit 15, and drive the projecting unit 30 to protrude out of the host 20 to project videos on the screen 13. Thus, the display unit 10 of the portable electronic device 100 is adjustable.

The focus of the projecting unit 30 can be adjusted by enabling software or hardware of the portable electronic device 100. Thus, the portable electronic device 100 can provide a high quality display.

Figure 5:
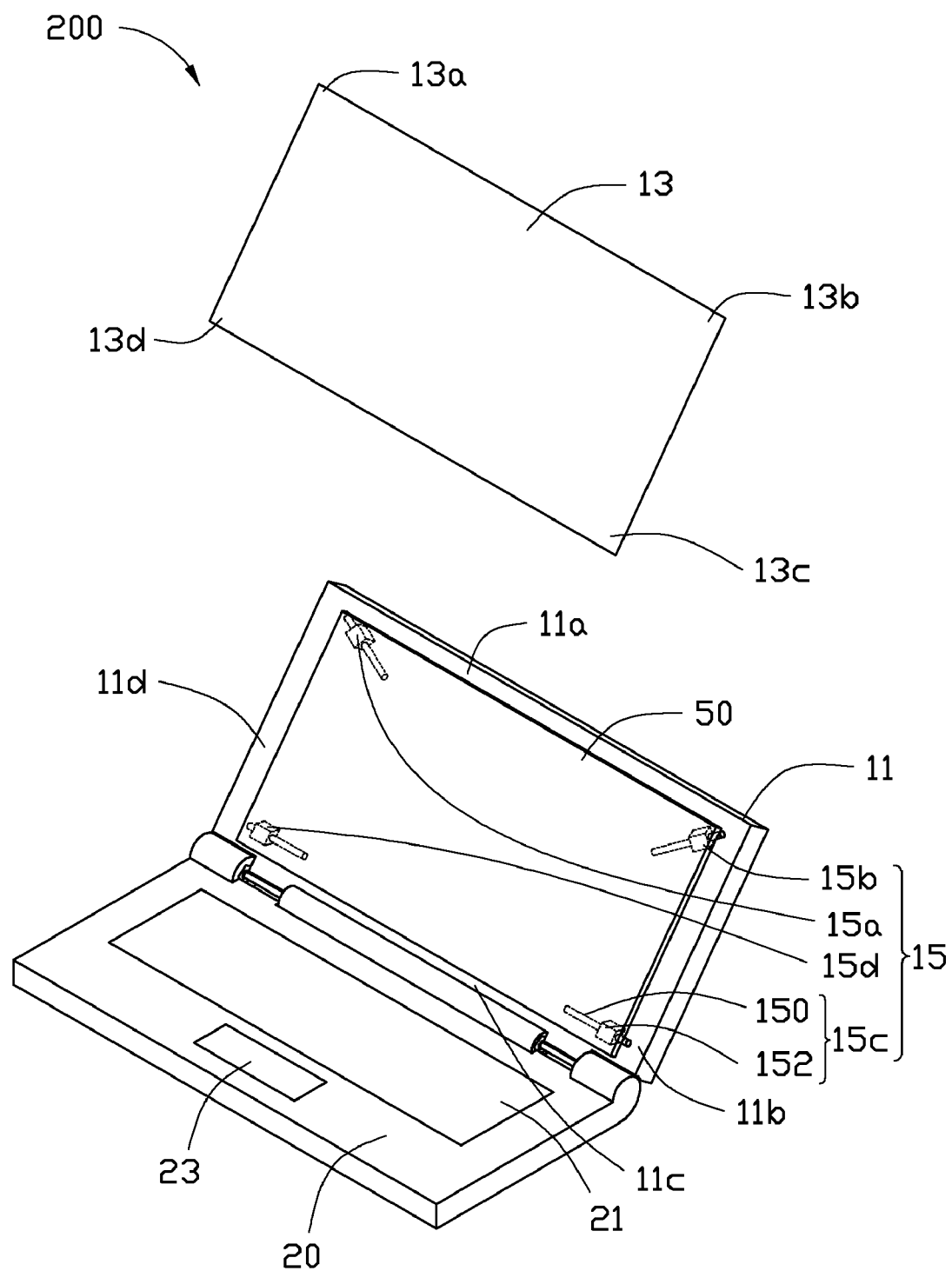
FIG. 5 is an exploded view of a portable electronic device according to another exemplary embodiment.

In other embodiments, referring to FIG. 5, the portable electronic device 200 further includes a display panel 50 under the screen 13. When the projecting unit 30 is used to project an image, the screen 13 is located on top of the display panel 50. When the display panel 50 is used to display, the screen 13 is removed from the display panel 50. Thus, the portable electronic device 200 gives two choices for the users to enjoy themselves.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation to encompass all such modifications and similar arrangements.

What is claimed is:

1. A portable electronic device, comprising:
a host;
a display unit pivotably connected to the host; and
a projecting unit received in the display unit, the projecting unit configured for receiving video signals from the host and projecting corresponding image on the display unit;
wherein the projecting unit is received in the host, and the portable electronic device further comprises a lifting unit for loading the projecting unit and driving the projecting unit to be raised and lowered in relationship to the host; the host comprises a touch pad, the touch pad is disposed on the surface of the host, the host defines a compartment for receiving the projecting unit and the lifting unit, and the touch pad covers the compartment.

2. The portable electronic device of claim 1, wherein the display unit comprises a display panel and a screen detachably disposed on the display panel.

3. The portable electronic device of claim 1, wherein the lifting unit comprises a platform and a driving subunit, the platform is configured for loading the projecting unit, and the driver subunit is configured for driving the platform to go up or down.

4. The portable electronic device of claim 1, wherein the display unit comprises a cover and a screen, the cover is pivotably connected to the host, the screen is moveable disposed on the cover.

5. The portable electronic device of claim 4, wherein the display unit further comprises a stretching unit disposed on the cover, the screen is fixed on the stretching unit and is extensible, and the stretching unit is configured for adjusting size of the screen.

6. The portable electronic device of claim 5, wherein the screen is made of elastic materials.

7. The portable electronic device of claim 5, wherein the cover comprises four edges which are serially interconnected, the cover at the side of one edge is pivotably connected to the host, the stretching unit comprises four drivers disposed on four corners of the cover and four corners of the screen are positioned on the four drivers respectively.

8. The portable electronic device of claim 7, wherein each driver comprises a rotor and a stator, the corners of the screen are positioned on the four rotors, and the four stators are configured for driving the corresponding rotor to deform the screen.

9. The portable electronic device of claim 8, wherein two of the four drivers are disposed on two opposite ends of the edge which is pivotably connected to the host, and the two corresponding rotors are substantially parallel to the edge, and the two drivers drive the two corresponding rotors to move parallel to the edge.

10. The portable electronic device of claim 9, wherein the other two of the four drivers are disposed on two diagonal lines of the cover, the two corresponding rotors are substantially parallel to the two diagonal lines of the cover, and the two drivers drive the two corresponding rotors to move along the two diagonal lines of the cover.

11. A portable electronic device, comprising:
a host;
a display unit comprising:
a cover pivotably connected to the host;
an stretching unit disposed on the cover; and
an extensible screen disposed on the stretching unit; and
a projecting unit received in the host, the projecting unit configured for receiving video signals from the host and projecting the corresponding image on the screen.

12. The portable electronic device of claim 11, wherein the display unit further comprises a display panel pivotably connected to the host, and the screen is detachably disposed on the display panel.

13. The portable electronic device of claim 11, wherein the cover comprises four edges which are serially interconnected, the cover is pivotably connected to the host, the stretching unit comprises four drivers disposed on four corners of the cover respectively, and four corners of the screen are disposed on the four drivers respectively.

14. The portable electronic device of claim 13, wherein each driver comprises a rotor and a stator, the corners of the screen are disposed on the four rotors respectively, the four stators are configured for driving the corresponding rotor to stretch the screen, two of the four drivers are disposed on two opposite ends of the edge which is pivotably connected to the host, and the two corresponding rotors are substantially parallel to the edge.

15. The portable electronic device of claim 14, wherein the other two of the four drivers are disposed on two diagonal lines of the cover, and the two corresponding rotors are substantially parallel to the two diagonal lines of the cover, and the two drivers drive the two corresponding rotors to move along the two diagonal lines of the cover.

16. A portable electronic device, comprising:
a host;
a display unit comprising:
- a cover pivotably connected to the host; and
- a screen disposed on the cover;

a projecting unit received in the host for projecting an image on the screen; and a lifting unit received in the host, the lifting unit configured for driving the projecting unit to raise and lower in relationship to the host.

17. The portable electronic device of claim 16, wherein the lifting unit comprises a platform and a driving subunit, the platform is configured for loading the projecting unit, and the driver subunit is configured for driving the platform to go up or down.

18. The portable electronic device of claim 17, wherein the host comprises a touch pad, the touch pad is disposed on the surface of the host, the host defines a compartment for receiving the projecting unit and the lifting unit, and the touch pad covers the compartment.

* * * * *